(No Model.)

A. E. ROBERTS.
HORSE HAY RAKE.

No. 352,205. Patented Nov. 9, 1886.

Witnesses:
A. H. Orwig
C. H. Hudgens

Inventor: Albert E. Roberts,
By Thomas G. Orwig, Atty.

UNITED STATES PATENT OFFICE.

ALBERT E. ROBERTS, OF NORWALK, OHIO.

HORSE HAY-RAKE.

SPECIFICATION forming part of Letters Patent No. 352,205, dated November 9, 1886.

Application filed November 9, 1885. Serial No. 182,102. (No model.)

*To all whom it may concern:*

Be it known that I, ALBERT E. ROBERTS, a citizen of the United States of America, and a resident of Norwalk, in the county of Huron and State of Ohio, have invented a new and useful Improvement in Horse Hay-Rakes, of which the following is a specification.

My improvement relates to the manner of fastening spring-teeth to a rake-head; and my invention consists in the construction and combination of a tooth-clamping device, a self-adjusting tooth-support, a detachable spring-tooth, and a rake-head, as hereinafter set forth, pointed out in my claims, and illustrated in the accompanying drawings, in which—

Figure 1:
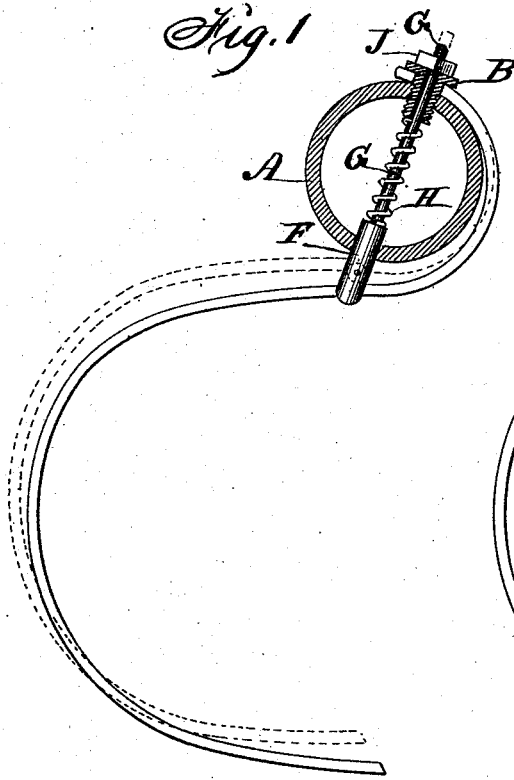
Figure 2:
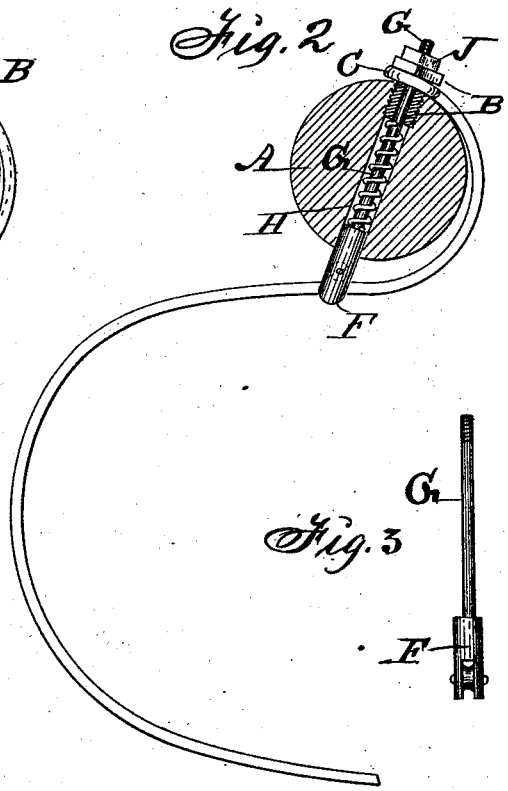
Figure 3:
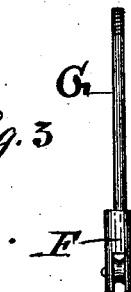
Figure 4:
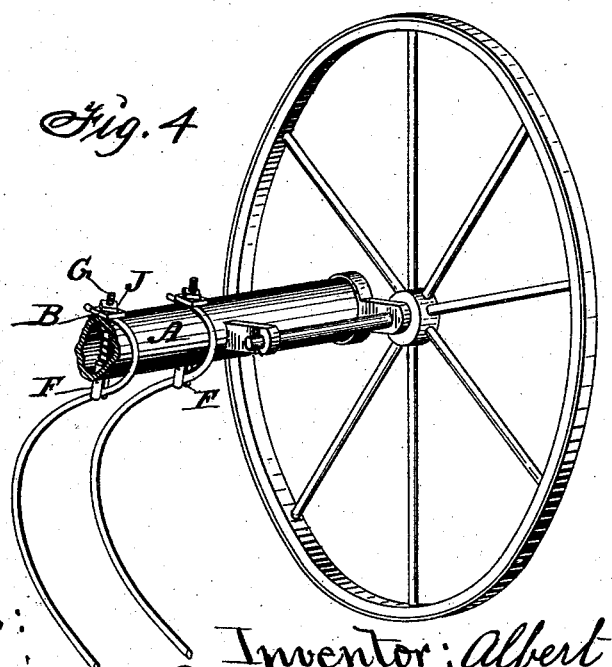

Figure 1 is a transverse section of a tubular metal rake-head having a spring-tooth fastened thereto by means of my clamping device and tooth-support. Fig. 2 shows a clamping device inserted in a transverse bore formed in a solid wooden rake-head and the self-adjusting support combined therewith. Fig. 3 is a view of the tooth-support provided with an anti-friction roller in its lower end. Fig. 4 is a perspective view of a section of a tubular rake-head having spring-teeth attached by means of my device.

A represents a rake-head, that may be provided with stub-axles at its ends and supported upon traction-wheels in a common way. To connect spring-teeth therewith in such a manner that they will have a self-adjusting bearing or support at some distance from the rake-head, to prevent them from being strained and broken off from the rake-head when their lower free ends come in contact with unyielding obstructions on the ground, I form a series of transverse bores through the rake-head, to receive, protect, and partially conceal my clamping devices and self-adjusting supports.

B is a tubular screw-bolt and bushing extended into the bore in the rake-head in such a manner that its flange or head, or a washer placed under it, will engage a rake-tooth, and its screw-threaded end project through the screw-threaded bore in the top side of the rake-head.

C represents an eye, that is preferably formed on the end of a spring-tooth, and the screw-threaded end of the tubular bolt is passed through the eye and into the bore in the axle, to clamp the tooth fast to the rake-head by simply turning the bolt into the screw-threaded top of the bore in the head.

F is the lower and bifurcated end of my tooth-support, and G an extension of smaller diameter, that has a screw-threaded end. The diameter of the upper end corresponds with the bore of the tubular bolt and the diameter of its lower end with the bore in the rake-head, through which it is extended.

H is a spring that rests upon the shoulder at the top of the part F, and is concealed and protected in the rake-head, and in its normal condition holds the tooth-support stationary.

J is a nut placed on the top end of the part G and on top of the head of the tubular bolt B, to suspend the support in its bearings and to restrict its downward motions in the rake-head. Each spring-tooth thus connected with the rake-head passes under the bifurcated lower end, F, of one of my self-adjusting tooth-supports in such a manner that when its lower end comes in contact with a root or other immovable obstruction the resisting force applied to the tooth will be met by the spring H, and the tooth thereby relieved from strain and damage, as it is drawn backward and pressed upward while forced over the obstruction; and as quick as the tooth has passed over the obstruction the spring compressed thereby will resume its normal position and aid in bringing the elevated tooth into alignment with the series of teeth.

I am aware that tooth-supports have been combined with rakes; but my manner of extending a tooth-support through a bore in a rake-head is novel and greatly advantageous, in that the greater portion of the support is concealed and protected, and will not become clogged and inoperative by hay adhering thereto.

I claim as my invention—

1. The combination of a tubular screw-bolt with a rake-head having a transverse bore, a rake-tooth, and a tooth-support extended through the tubular bolt and the bore in the rake-head, for the purposes stated.

2. The combination of a rake-head having a transverse bore, a tubular bolt, a rake-tooth, a tooth-support extended through the tubular bolt and the bore in the rake-head and provided with a bearing at its lower end to engage a tooth, a shoulder at its central portion, and a screw-threaded top end, a nut on the said screw-threaded top end, and a spring resting upon the shoulder of the tooth-support, to operate in the manner set forth, for the purposes stated.

3. A rake-head having a transverse bore, a tubular bolt or bushing, B, a rake-tooth, a tooth-support, F G, extended through the tubular bolt and the bore in the rake-head, a spring, H, and a nut, J, arranged and combined substantially as shown and described, for the purposes stated.

ALBERT E. ROBERTS.

Witnesses:
C. D. HUDGENS,
THOMAS G. ORWIG.